R. F. ABBÉ.
GRINDING MILL.
APPLICATION FILED OCT. 29, 1910.

997,592.

Patented July 11, 1911.

2 SHEETS—SHEET 1.

Witnesses:
John Murtagh
L. J. Murphy

Inventor
Richard F. Abbé
By his Attorneys

R. F. ABBÉ.
GRINDING MILL.
APPLICATION FILED OCT. 29, 1910.
997,592.
Patented July 11, 1911.
2 SHEETS—SHEET 2.
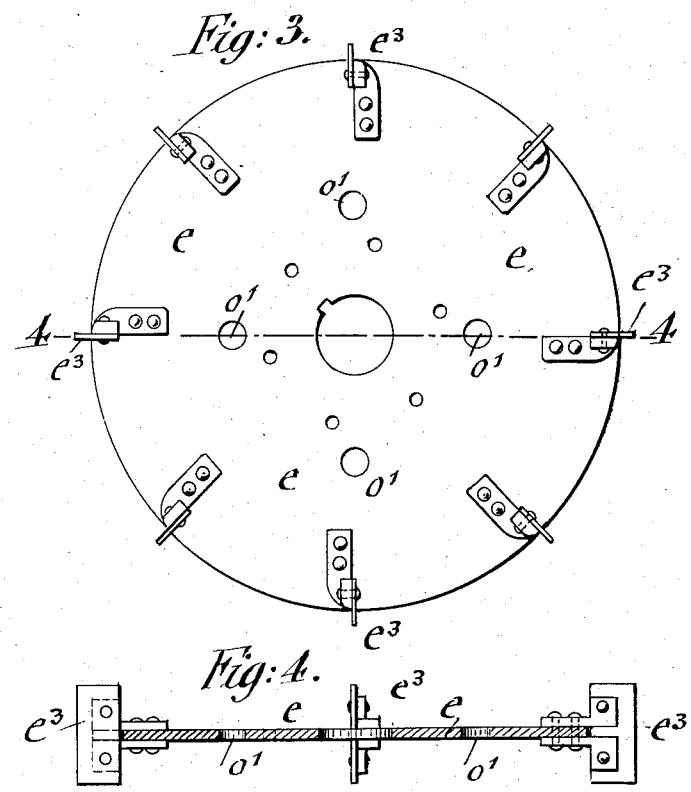
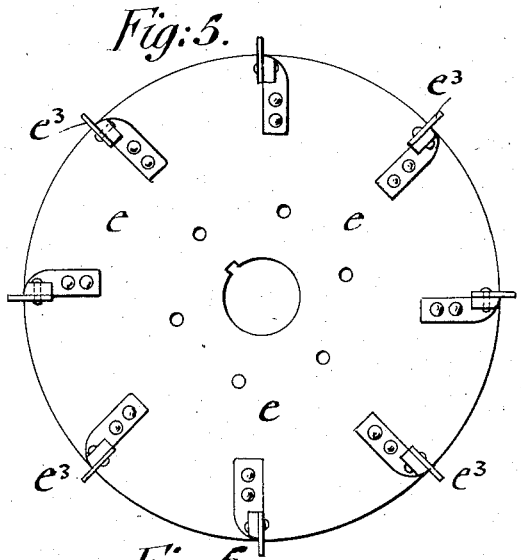
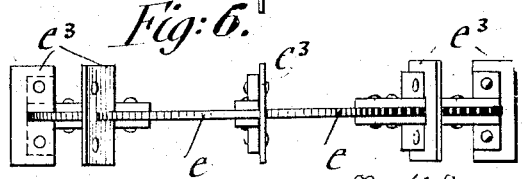
Witnesses:
John Murtagh
L. J. Murphy
Inventor
Richard F. Abbé
By his Attorney

UNITED STATES PATENT OFFICE.

RICHARD F. ABBÉ, OF NEW YORK, N. Y.

GRINDING-MILL.

997,592.   Specification of Letters Patent.   Patented July 11, 1911.

Application filed October 29, 1910. Serial No. 589,780.

*To all whom it may concern:*

Be it known that I, RICHARD F. ABBÉ, a citizen of the United States, residing in the city of New York, borough of Brooklyn, in the county of Kings and State of New York, have invented certain new and useful Improvements in Grinding-Mills, of which the following is a specification.

This invention relates to grinding mills, and more especially to that type which is intended to pulverize moist or sticky substances, such as crude or unrefined sugar and other substances by subjecting them to the grinding action of horizontal disks superposed one above the other on a vertical shaft; and having radial beaters, said disks being surrounded by a casing having a step-shaped interior grinding surface; and for this purpose the invention consists of a grinding mill which comprises an exterior casing, an interior step-shaped grinding shell, means for supplying the substances to be pulverized, a vertical driving-shaft, horizontal disks mounted on said shaft and provided with radial beaters, located at the circumference of the disks and working in conjunction with the riffled interior grinding shell of the casing, the upper disks having openings, while the lowermost disk is imperforate, as will be fully described hereinafter and finally pointed out in the claims.

Figure 1:
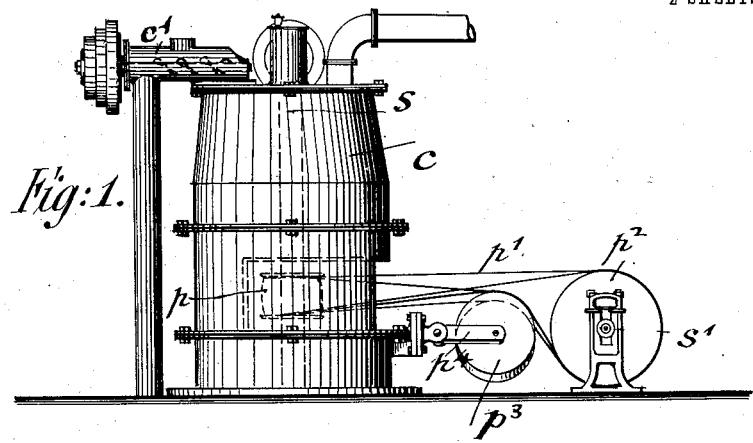
Figure 2:
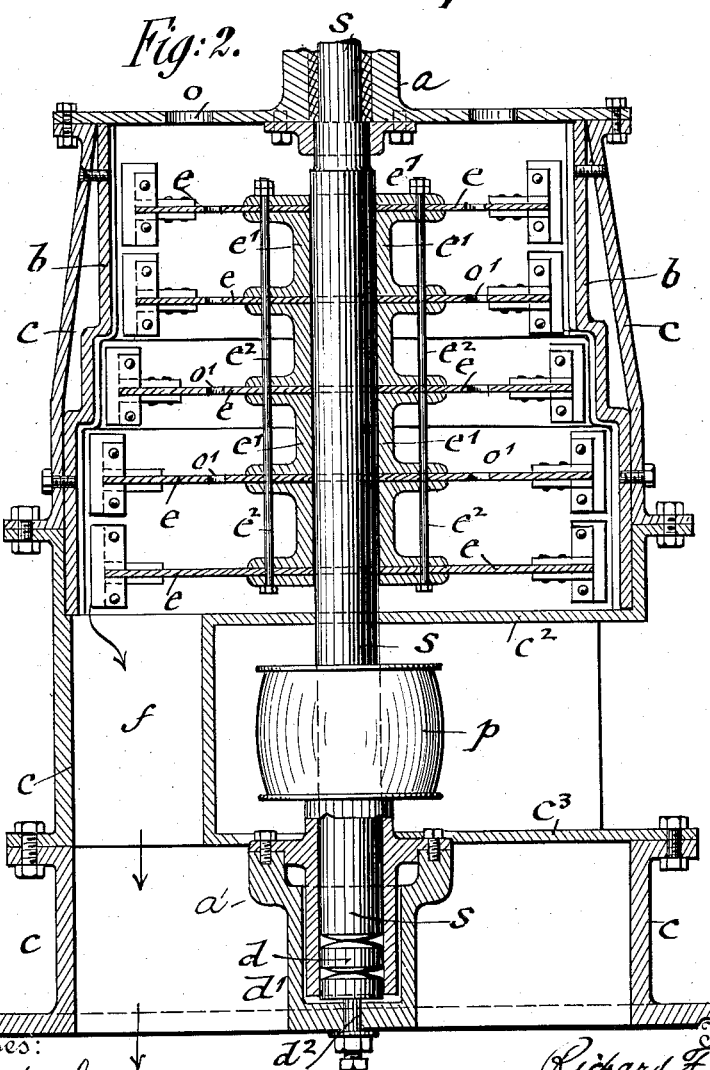

In the accompanying drawings, Figure 1 represents a side-elevation of my improved grinding mill for pulverizing moist or sticky substances; Fig. 2 is a vertical central section drawn on a larger scale; and Figs. 3 and 5 are plan-views of the second lowest and of the lowermost grinding disks, and Figs. 4 and 6 are respectively a vertical transverse section on line 4, 4, Fig 3, and a side-view of Fig. 5.

Similar letters of reference indicate corresponding parts throughout the several figures.

Referring to the drawings, $c$ represents the casing of my improved grinding mill for moist or sticky substances. The casing is closed all around and is provided at the interior with a riffled, step-shaped grinding shell $b$, the steps in the same enlarging in diameter from the upper toward the lower end. The substances to be pulverized in the grinding mill are conducted by means of a conveyer $c'$ from a hopper or trunk to the supply-opening $o$ in the top-plate of the casing, as shown in Fig. 1.

At the center of the casing $c$ is supported in suitable neck and step-bearings $a$, $a'$ a vertical disk-carrying shaft $s$, the neck-bearing being supported on the top-plate of the casing, while the step-bearing is attached to the bottom-plate of the casing, both bearings being provided with suitable lubricating devices for oiling the journals of the shafts. The lower end of the vertical shaft $s$ is supported on a hard wood disk $d$ and, the latter on a steel disk $d'$, which disks are capable of vertical adjustment so as to take up the wear by means of an adjusting screw $d^2$, which passes through the bottom of the lower step-bearing of the shaft. The lubricating devices are connected with suitable oil-chambers in the bearings in the usual manner.

The shaft $s$ is rotated by means of a power-driven pulley $p$, a belt $p'$ and a pulley $p^2$ on the shaft $s'$, said pulley $p$ being located above the step-bearing in a chamber of the casing $c$, formed by horizontal plates $c^2$, $c^3$, as shown in Fig. 2, said driving-belt being kept in stretched position by means of an idler-pulley $p^3$, which is supported by a fork $p^4$ that is pivoted to a supporting plate attached to the lower part of the casing $c$.

On the shaft $s$ are mounted horizontal disks $e$, the hubs $e'$ of which are keyed to the shaft, said hubs being connected by vertical rods $e^2$, the diameter of the disks corresponding with the diameter of the step-shaped grinding shell. The upper portion of the grinding shell is concentric with the upper disks and the lower larger portions concentric with the lower disks. To the circumference of the disks $e$ are riveted or otherwise attached radial beaters $e^3$, which are rotated in close proximity with the inner riffled surface of the grinding shell, so that the material to be pulverized and which is fed through the feed-opening of the top-plate into the casing, is conducted by centrifugal action toward the circumference of the disks and then through the narrow spaces between the upper edges of the beaters and the inner grinding surface of the shell. The upper quickly-rotating disks $e$ are provided with a number of ventilating openings $o'$ in their webs, with the exception of the lowermost disk, so that the air drawn in by the rotary motion of the disks, permits the free movement of the material to be pulverized toward the circumference of the disks without being retarded or clogged. As the lowermost disk is not provided with air-supply openings, the material dropping on the same is finally passed through between the outer edges of the beaters and the inner riffled portions of the grinding shell. The rapid rotary motion of the disks sucks in the air and secures the quick and uniform passage of the material to be pulverized through the mill and its discharge through the bottom of the casing to a passage $f$, from which it is dropped to a conveyer or supporting hopper below. The material to be pulverized, being successively acted on by the beaters and the interior grinding surface of the casing, is delivered in finely-ground condition to the open lower part of the grinding mill, as indicated by arrows in Fig. 2. The air sucked in by the beaters serves for cooling the substances to be pulverized, so that the same are finally delivered in pulverized condition to the discharge-channel at the bottom of the casing. The disks and their beaters can be readily removed from the grinding mill for being replaced when worn-out, the upper portion of the casing being removable by loosening the connecting bolts between the upper and lower portions.

The grinding mill is adapted for grinding crude or unrefined sugar, licorice, gelatin and similar moist or sticky substances which have to be pulverized in dry state in a quick and reliable manner.

Having thus described my invention, I claim as new and desire to secure by Letters Patent:

1. A grinding mill, comprising an exterior closed casing, an interior riffled grinding-shell in said casing, a vertical shaft supported by step and neck-bearings in the casing, means for supplying the material to be pulverized, and a plurality of disks provided with radial beaters at their circumferences, mounted on said shaft, the upper series of disks excepting the lowermost disk being provided with suction-openings.

2. A grinding mill, comprising a closed exterior casing, means for supplying material to be ground to the upper part of the casing, an interior step-shaped grinding shell attached to the casing, a vertical shaft journaled in neck and step-bearings in said casing, means for imparting a rotary motion to said shaft, and a plurality of horizontal disks, mounted on said shaft, radial beaters attached to the circumference of the disks, said disks having gradually increasing diameters corresponding to the steps of the grinding shell, the upper series of disks, with the exception of the lower disk being provided with air suction-openings for preventing the clogging of the material to be pulverized by said disks.

In testimony, that I claim the foregoing as my invention, I have signed my name in presence of two subscribing witnesses.

RICHARD F. ABBÉ.

Witnesses:
PAUL GOEPEL,
JOHN MURTAGH.